May 9, 1933.    R. J. NORTON    1,908,439
BRAKE MECHANISM
Filed March 19, 1931

Inventor
RAYMOND J. NORTON
By Semmes and Semmes
Attorney

Patented May 9, 1933

1,908,439

UNITED STATES PATENT OFFICE

RAYMOND J. NORTON, OF WASHINGTON, DISTRICT OF COLUMBIA, ASSIGNOR TO BENDIX BRAKE COMPANY, OF SOUTH BEND, INDIANA, A CORPORATION OF ILLINOIS

BRAKE MECHANISM

Application filed March 19, 1931. Serial No. 523,829.

This invention relates to brakes and pertains more specifically to the resilient elements adapted to restore the brake parts to their unapplied position.

In previous brake constructions, the applying means for the brake, usually a cam or lever arrangement, moves but a small amount in applying the brake, and consequently the force applied to the foot pedal or hand lever is greatly multiplied. Conversely, the springs tending to release the friction means have whatever force that is transmitted to the operating means greatly reduced, and said springs consequently have practically no effect in restoring the operating parts. One feature of my invention is to provide a resilient element adjacent the wheel brake parts and connected to the cam or other operator to restore it to its unapplied position. Preferably this connection is made through a crank arm or other force multiplying device.

A further feature of this invention is the use of such resilient means to also act upon the friction means, to restore it as well to its unapplied position.

Yet another object of this invention is to use the return springs of the friction element to return the cam or other operator to its unapplied position, by connecting the ends of the springs, formerly attached to the backing plate, to the operator, thereby utilizing what were previously "dead" ends of the springs.

A further object of this invention pertains particularly to servo-brakes. In such brakes, where a primary shoe applies a secondary shoe, a special spring has heretofore been used to tend to keep the secondary shoe from engaging the drum. It is a further object of my invention to accomplish the function of such a spring by the novel spring arrangement referred to above, thereby dispensing with the necessity of providing a special spring for this purpose.

With these and other objects in view, which may be incident to my improvements, the invention consists in the parts and combinations to be hereinafter set forth and claimed, with the understanding that the several necessary elements comprising my invention may be varied in construction, proportions and arrangement, without departing from the spirit and scope of the appended claims.

In order to make my invention more clearly understood, I have shown in the accompanying drawing means for carrying the same into practical effect without limiting the improvements in their useful applications to the particular constructions, which, for the purpose of explanation, have been made the subject of illustration.

Figure 1:
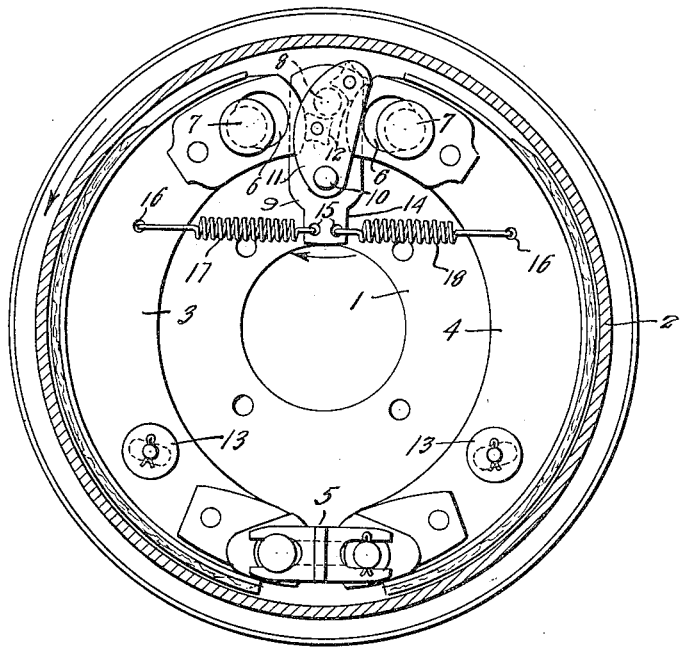
Figure 1 is a sectional view of my novel brake mechanism, the section being taken just within the head of the brake drum.

Referring to Figure 1, there is shown a backing plate, 1, which may be mounted on the axle housing or other non-rotatable part of the wheel assembly, and a brake drum, 2, attached to the wheel. Positioned within the drum and engageable therewith are two brake shoes, 3 and 4, connected together by the floating, adjustable connection, 5. Each shoe has an opening 6 near its unconnected end, cooperating with an abutment pin, 7. These pins and openings serve to position the shoes in their unapplied position, and when the brake is applied, one or the other of the pins takes the braking thrust in a well known manner.

Mounted on a shaft 8 passing through the backing plate is a crank arm 9 provided with a mounting pin 10. Mounted on pin 10 is the floating brake operator 11 having elements 12 pivotally mounted thereon and engaging the ends of the brake shoes.

A steady rest, 13, is provided for each of the shoes 3 and 4.

The mechanism so far described is a well known type of dual acting servo brake, to which, for purposes of illustration, I shall show my invention applied. In applying my invention to this structure, I have extended the crank arm 9 downwardly to provide the extension 14, provided with the apertures 15. Corresponding apertures, 16, are provided in the brake shoes, and in these apertures are mounted spring 17, connecting shoe 3 to extension 14, and spring 18, connecting shoe 4 to extension 14.

The functions of these springs will be readily appreciated from the drawing. First, these springs serve to retract the shoes 3 and 4 from the drum when brake applying pressure is released, and in conjunction with the pins 7 and openings 6, serve to position the shoes in their proper unapplied position. Secondly, these springs serve to return the brake applying crank arm, 9, to its unapplied position when braking pressure is released. In this connection, the long arm, extending from pivot 8 to apertures 15, of the restoring force of the springs is to be particularly noted.

A third function involves the servo action of the brake. In Figure 1, the normal direction of rotation of the wheel and drum is shown by the arrow adjacent the upper left portion of the drum. Accordingly, in applying the brake, shoe 3 acts as a servo shoe, and shoe 4 acts as a secondary shoe. The novel resilient means described above insures the brake shoe 4 remaining out of contact with the drum until after the servo shoe 3 is applied, as follows: In applying the brake, crank arm 9, and accordingly extension 14, move in the direction indicated by the arrow adjacent the latter. This movement places spring 18 under additional tension, which insures shoe 4 remaining out of contact with the drum until it is applied by the servo action of shoe 3.

Figure 2:
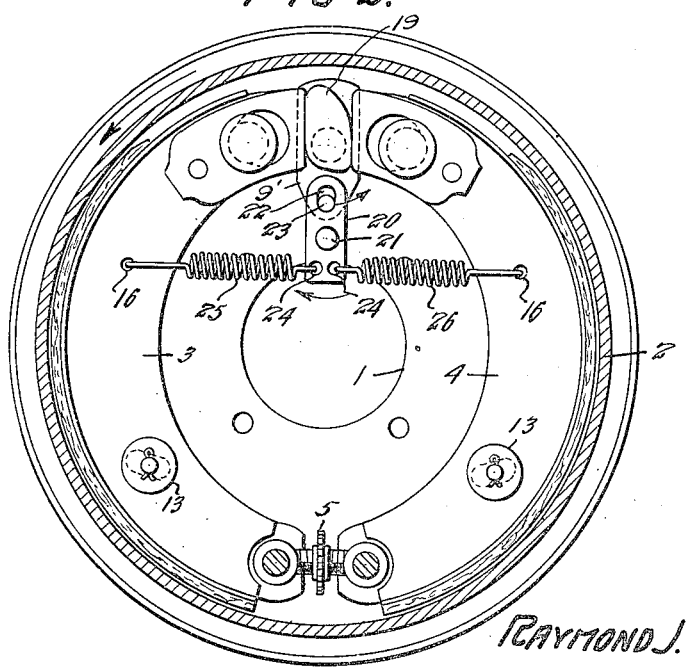
Figure 2 is a similar sectional view of a modification.

In some types of brakes, a direction changing device may be necessary and one type thereof is shown in Figure 2. Most of the parts shown in Figure 2 are similar to those shown in Figure 1. The operator has been somewhat simplified, a cam 19 being shown as integral and movable with the crank arm 9'. The cam and crank arm rotate in the direction indicated by the arrow adjacent them, which would cause less tension, rather than more, in the spring attached to the secondary shoe, if the arrangement of Figure 1 were used. Accordingly, a direction changing device is provided, which consists of a lever 20 mounted on pin 21 in the backing plate. The upper end of the lever is provided with a slot 22 coacting with pin 23, and the lower end of the lever is provided with apertures 24, for receiving springs 25 and 26, analogous to springs 17 and 18, respectively, of Figure 1.

The lower end of the lever 20 moves as indicated by the arrow when the brake is applied, placing the spring 26 under additional tension and thus insuring that the secondary shoe 4 will not engage the drum until it is applied by servo shoe 3.

If desired, springs 17 and 18, or 25 and 26 may be replaced by a single spring extending from one shoe to the other, and secured at its middle portion to the extension 14 or lever 20.

The proper vertical positioning of the brake shoes is obtained by the action of the springs conjointly with the edges of openings 6 and pins 7. If desired, however, a vertical component may be provided in the springs by placing apertures 16 further down the shoes 3 and 4.

While I have shown and described the preferred embodiment of my invention, I wish it to be understood that I do not confine myself to the precise details of construction herein set forth by way of illustration as it is apparent that many changes and variations may be made therein by those skilled in the art without departing from the spirit of the invention or exceeding the scope of the appended claims.

I claim:

1. A brake comprising, in combination, a drum, friction means within the drum and comprising a primary portion and a secondary portion, operating means for said friction means, resilient means connected to said secondary portion of the friction means, tending to keep said portion out of contact with the drum, and means for increasing the tension of said resilient means when the brake is applied, said means comprising a lever and an extension attached to the operating means.

2. A brake comprising, in combination, a drum, friction means within the drum having a primary and a secondary portion, an operator for said friction means, an extension on said operator, a lever operated by said extension, and resilient means connecting said lever and said secondary portion whereby increased brake retracting force is placed upon said secondary portion when the brake is applied.

3. A brake comprising, in combination, a drum, a servo brake member engageable with said drum comprising a primary and a secondary shoe, a rotatable operating means for said brake member, a tension element connected to said primary shoe, a second tension element connected to said secondary shoe, and an extension moving with said operating means to increase the tension in the tension element connected to the secondary shoe and reduce the tension in the tension element connected to the primary shoe upon operation of the operating means.

In testimony whereof, I have hereunto signed my name.

RAYMOND J. NORTON.